Dec. 30, 1969  K. I. EKLUND  3,486,738
METHOD AND MEANS FOR FASTENING A WOODEN
MEMBER TO A METAL SUPPORT
Filed Feb. 13, 1967  3 Sheets-Sheet 1

INVENTOR
Kurt I. Eklund

BY
ATTORNEYS

Dec. 30, 1969             K. I. EKLUND           3,486,738
METHOD AND MEANS FOR FASTENING A WOODEN
MEMBER TO A METAL SUPPORT
Filed Feb. 13, 1967                                           3 Sheets-Sheet 2
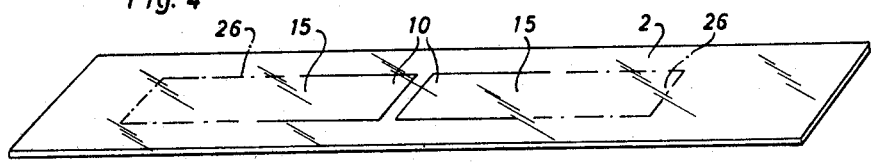
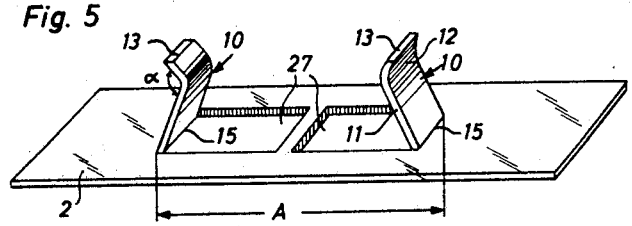
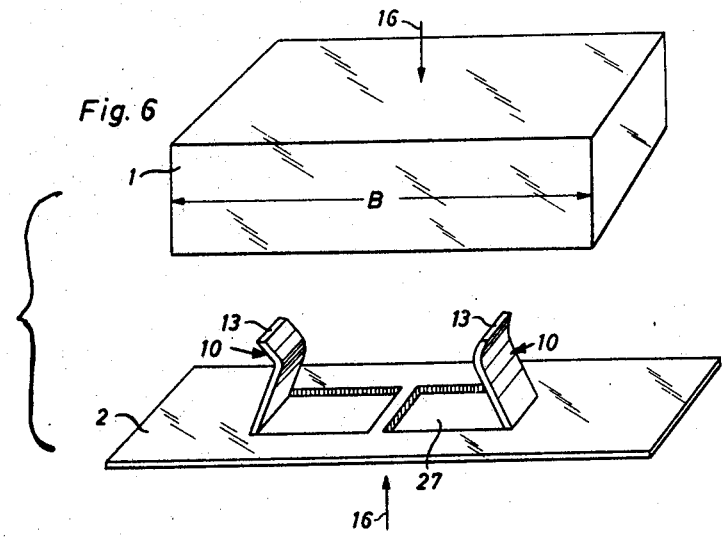
INVENTOR
Kurt I. Eklund
BY
Holman, Glascock, Downing & Seebold
ATTORNEYS

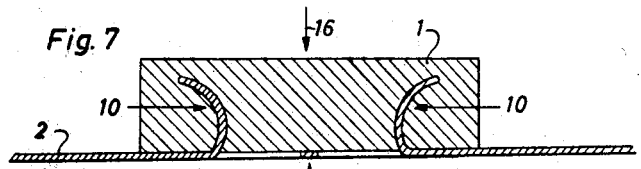
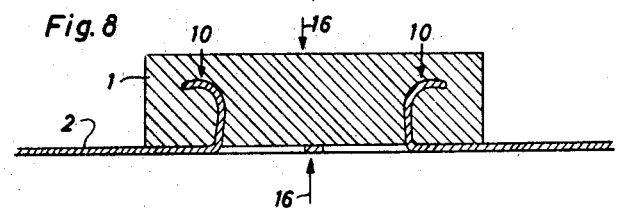
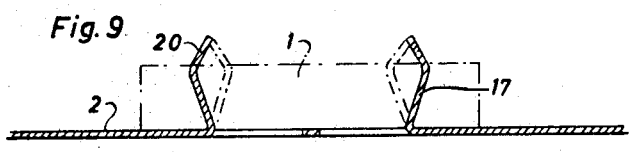
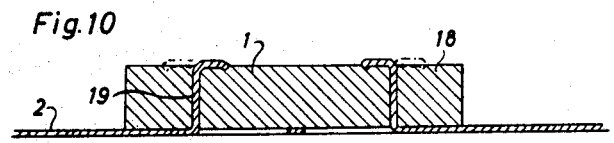
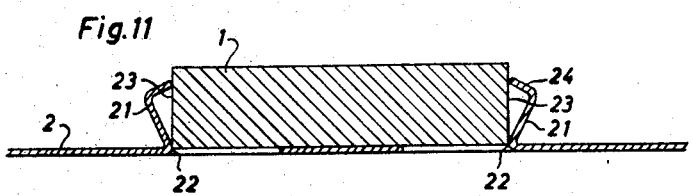
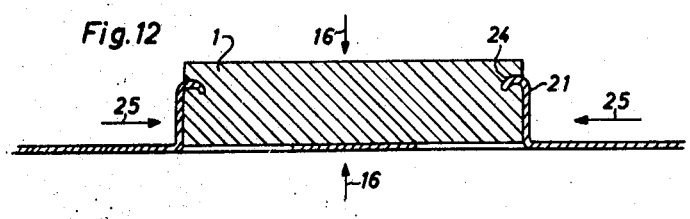

United States Patent Office 3,486,738
Patented Dec. 30, 1969

3,486,738
METHOD AND MEANS FOR FASTENING A WOODEN MEMBER TO A METAL SUPPORT
Kurt Ingvar Eklund, Finsjo, Sweden
Filed Feb. 13, 1967, Ser. No. 615,737
Claims priority, application Sweden, Feb. 15, 1966, 1,912/66
Int. Cl. E04h 17/16; B21f 27/00; B23p 11/00
U.S. Cl. 256—22                                    4 Claims

ABSTRACT OF THE DISCLOSURE

The fastening of a wooden member to a metal support having a pair of tongues of angular or arcuate shape, the free ends thereof either facing toward or away from each other comprising compressing the member and support for causing the tongues to penetrate the member whereby the bent shape of the tongues coacts with the wood to further bend the tongues and continuing the compressing after complete penetration of the tongues for causing a temporary compression of the member and still further bending of the tongues within the member.

---

The present invention relates to prefabricated structures comprising wooden, usually elongated members secured to a metal support. More specifically, the invention relates to an improved method and means for manufacturing fences or fence-like structures where wooden pales are secured to metal rails. The building of fences and similar structures has hitherto required a substantial amount of fairly accurate workmanship at the building site, which of course makes for a comparatively expensive structure.

It has therefore been suggested to use an industrial method for prefabricating such structures sectionwise, with the only work required at the building site being the joining of the prefabricated sections.

The suggested method comprises the steps of striking a pair of tongues from the metal rail at a place where a pale is to be secured, bending the tongues somewhat towards each other in such a way that when the pale and the rail are pressed against each other, the tongues will be caused to penetrate into the wooden pale. Due to the initial bending of the tongues, these will be further bent towards one another when the pale and the rail are pressed together and will thus form a strong bond with the pale by gripping the material situated between the tongues which act somewhat as arcuate claws and securely hold the material.

One object of the present invention is to improve on the abovementioned method and comprises providing each pair of tongues with a more or less arcuate or angular bend, with the tongues in each pair facing either towards or away from each other whereby the free end of each tongue is situated essentially directly above the base where the tongue is attached to the rail, and continuing the compression between the pale and rail after the tongues have penetrated into the rail, with this compression causing a temporary compression of the pale thus forcing the tongues to bend still further inside the wood.

A further object of the invention is to provide a rail having tongues struck therefrom and bent as specified above, intended for the manufacture of a fence.

It has namely proved essential to the method that the free ends of the tongues, before the pale is joined to the rail, be situated directly above the base of the respective tongue. It is also preferable that the tongue in the vicinity of its free end forms a guiding surface which is directed in such a way that when the tongues have penetrated through the surface layer of the pale they will be bent in opposite directions, towards or away from each other and engage with material that is not affected by the method as such, and which material, in a manner of speaking, is hooked onto the bent tongues which lock the pale and prevent it from coming loose from the rail.

It has further proved important that the pressing together of the pale and the rail be continued after the tongues have penetrated completely into the pale and it has made contact with the support. Such a continued pressing brings about a temporary compression of the, for the present purpose, sufficiently elastic wood causing a further compression and thereby also a further bending of the tongue, which latter component is manufactured from a metal material having greater stiffness than wood. When the further temporary compression is removed, the wood once more expands, but the stiffer tongues remain in their bent shape and grip the pale firmly.

The present invention resides in the improvement which the tongues according to the invention have proved to bring about such as the better result obtained with regard to gripping and the simplification of the tongues which may be obtained by simply punching them out of the material of the rail.

The manufacture of fences defined by wooden pales secured to at least one metal rail by fastening tongues struck from the rails and integral therewith which includes striking two tongues from the rail at a location where a pale is to be fastened, deflecting the tongues out of the plane of the rail at one side thereof, bending the tongues to an angular or arcuate shape with the free ends of the tongues facing in opposite directions and substantially opposite the base of the respective tongue where joined to the rail, placing the rail and pale in a spaced relation relative to each other with the tongues directed towards the pale, pressing the rail and pale together for causing the tongues to penetrate into the material of the pale so that the bent shape of the tongues coacts with the pale material to further bend the tongues, and continuing the pressing together of the pale and rail after the same have made surface contact and the tongues have completely penetrated the pale for effecting a temporary compression of the pale and a corresponding still further bending of the tongues within the pale.

Further objects and advantages of the invention will be made apparent by the following description of various embodiments of the invention and the claims.

FIGURES 1–3 illustrate the previously suggested method of joining a pale 1 and a rail 2 by means of tongues 3 struck from the rail and leaving holes 5 therein, separated from each other by a metal strip 4. The tongues have arcuate portions or shanks 6 which as shown in FIGURE 2 engage wooden material 8 of the pale.

FIGURE 3 shows the general appearance of a rail of the kind of which the method of the invention may be applied. In FIGURE 3 the pales are shown as pieces 7 of sapwood, but of course this is only a matter of choice.

The invention will in the following be briefly described with reference to the accompanying drawings of which FIGURES 4–8 show an embodiment of the tongues and different phases of a process carried out according to the method of the invention.

FIGURES 9 and 10 show a further, modified embodiment of the tongues and an embodiment of the method according to the invention.

FIGURES 11 and 12 show a still further modified embodiment of the tongues and two different phases of the method according to the invention.

Figure 1:
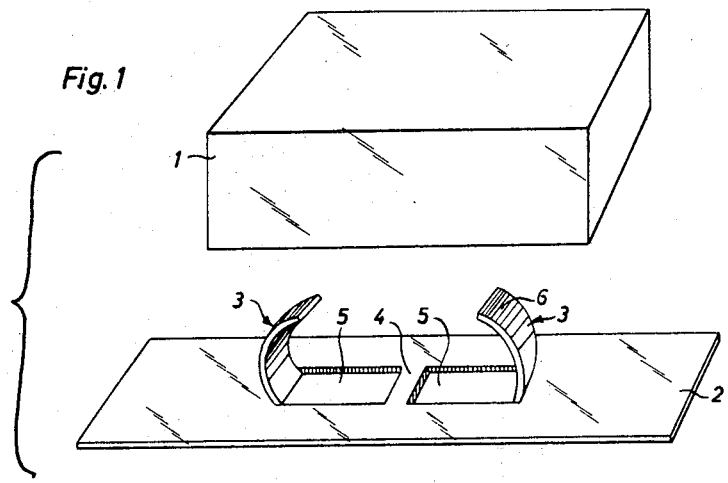
Figure 2:
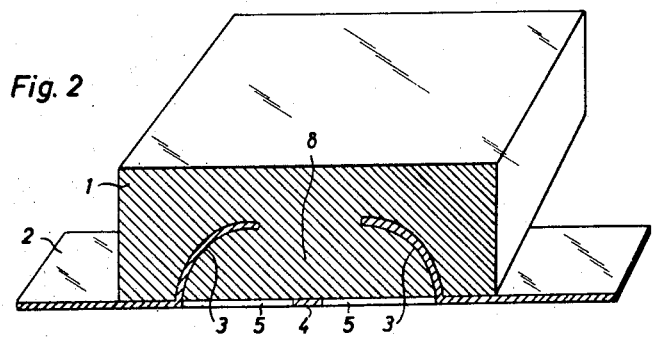
Figure 3:
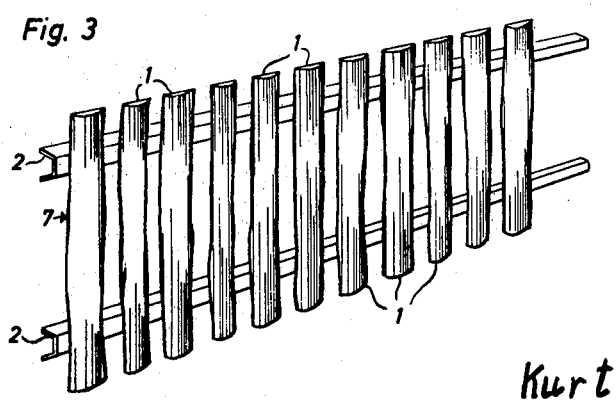

Tongues 10 shown in FIGURES 4–8 are bent in an angle so as to form a comparatively obtuse angle α between two shanks 11 and 12 of essentially equal length joining each other at a smoothly bent portion at the apex of the angle α. Further, free ends 13 of the tongues 10 are directed away from each other so that the greater part of the arcuate or cornered tongues 10 are situated directly above the holes in the rail 2 within the region A. The region A or the distance between bases 15 of the tongues 10 is somewhat less than the width B of the pale 1.

By means of a punching operation, the metal rail 2 is provided with the two tongues 10 at the place where a pale 1 is to be secured. The punching may be carried out in any suitable manner and forms no part of the present invention. Preferably, the tongues 10 are given their desired shape at the same time as they are punched, so that the entire rail after the combined punching and forming process is ready to be joined to the pales 1. The tongues 10 are thus bent after having been punched out of the metal rail 2 in opposite directions. The bending is carried out in such a way that the tongues are given an arcuate or angular shape so that the free ends 13 of the tongues 10 are situated essentially opposite to the base portion 15 of the tongue 10 in question, when the tongue joins the support. After the tongues have been punched out the support 2 will have the appearance shown in FIGURE 4. After the tongues have been bent to the above indicated shape, they will look similar to the embodiment shown in FIGURE 5. The rail 2 and the pale 1 are then joined in the manner shown in FIGURE 6 with the tongues 10 situated between the rail 2 and the pale 1. The pale 1 and the rail 2 are pressed against one another so that the tongues 10 penetrate into the pale 1 and due to the interaction between the shanks 12 of the tongues and the material in the pale 1, the tongues will be further bent in opposite directions. In the embodiment shown, they are bent towards one another, so that the tongues will surround material of the pale in such a way that the tongues 10 and consequently also the rail 2 is firmly secured to the pale 1 as shown in FIGURE 7.

According to the invention, however, the pressing together of the rail 2 and the pale 1 is continued also after that the tongues 10 as shown in FIGURE 7 have completely penetrated into the pale 1 and the pale has made contact with the rail 2 causing a temporary compression of the pale 1 and a corresponding further bending of the togues 10 within the pale 1 as shown in FIGURE 8. The tongues 10 are thereby given a claw-like shape which very effectively holds together the pale 1 and the rail 2 making it impossible to separate the elements without destroying the pale. The forces to which the pales and rail are subjected during the compression are indicated by means of arrows 16.

FIGURES 9 and 10 show an embodiment where the tongues are not completely embedded in the pale 1 but where longer tongues 17 first completely penetrate the pale 1 from side to side and protrude at side 18 of the pale 1 opposite to the rail. Main shanks 19 of the tongues have in this embodiment a length which is almost equal to the thickness of the pale 1. Guiding shanks 20 of the tongues 17 are considerably shorter than the main shank 19, but are nevertheless able to guide the tongues 17 during the pressing together from the initial position shown in FIGURE 9 to the final position shown in FIGURE 10. The free ends of the tongues 17 may either be directed towards each other as shown by means of solid lines in FIGURE 9 or they may be directed away from each other as indicated by dotted lines in the same figure. In FIGURE 9 the pale 1 has only been indicated by dot-dash lines in order to show the proportions between the tongues 17 and the pale.

In the embodiment shown in FIGURES 11 and 12 tongues 21 are shorter than the thickness of the pale 1 and the distance between bases 22 of the tongues 21 is somewhat greater than the width of the pale 1. The tongues 21 will therefore engage edges 23 of the pale, which edges run substantially perpendicular to the rail 2. Pressing the tongues 21 into the pale 1 is carried out by means of a suitable pressing tool which also presses together the pale 1 and the rail 2. During this pressing of the tongues 21 into the pale 1, shanks 24 of the tongues 21 interact with the wooden material in order to guide the tongues to engage the pale in such a way that the tongues 21 already after having been pressed in as described above, effectively grip and hold the pale 1 to the rail 2. The gripping becomes, however, further improved due to the further compression of the pale and rail where the tongues 21 are given form of claws as shown in FIGURE 12. The pressing of the tongues into the pale is in this case carried out in the direction indicated by arrows 25 and perpendicular to the direction indicated by the arrows 16 by means of which the shanks 24 are given their final claw-like shape.

In the embodiment described above, the tongues are punched out of the material of the rail as indicated by solid lines in FIGURE 4. It is, however, also possible that the tongues be punched out in the manner indicated by the dot-dash lines 26 in FIGURE 4 and where the tongues are directed away from each other and the holes which are left in the rail, corresponding to holes 27 shown in the embodiments, are essentially situated outside of the pale 1 and are thus not covered by the pale in the same way as holes 27. Whether the holes are to be situated under the pale or outside of it is in esthetical rather than a practical choice. It seems, however, that if the holes are covered by the pale this makes for a stronger design.

What I claim is:

1. A method for manufacturing fences defined by wooden pales secured to at least one metal rail by fastening tongues struck from the rail integral therewith, comprising the steps of striking two tongues from the rail at a place where a pale is to be fastened, deflecting the tongues out of the plane of the rail at one side thereof, bending the tongues so that the free ends face in opposite directions the free ends of the respective tongues face in opposite directions and substantially opposite to the base of the respective tongue where it joins the rail, placing the rail and the pale in a spaced relation relative to each other with the tongues directed towards the pale, pressing the rail and pale together to cause the tongues to penetrate into the material of the pale whereby the bent shape of the tongues coacts with the material of the pale to to further bend the tongues, and continuing the pressing together of the pale and the rail after the same have made surface contact and the tongues have completely penetrated into the pale for causing a temporary compression of the pale and a corresponding still further bending of the tongues within the pale.

2. A metal rail for use in manufacturing fences having wooden pales secured to at least one metal rail, comprising a pair of tongues directed outwardly from one side of the rail and bent to substantially arcuate angular shape at each place where a pale is to be secured, the free ends of each tongue being situated substantially opposite to the base of the tongue where it joins the rail, and the free ends of a pair of tongues being directed away from each other in such a manner that greater part of the tongues are situated opposite to the holes left in the rail at the places from which the tongues have been struck.

3. The rail as claimed in claim 2 in which a greater distance exists between the bases of a pair of tongues than the width of a pale.

4. The rail as claimed in claim 2 in which a greater distance exists between the bases of a pair of tongues than the width of a pale and said tongues being substantially of an inverted L shape.

References Cited

UNITED STATES PATENTS

| | | |
|---|---|---|
| 1,520,026 | 12/1924 | Hugh. |
| 1,536,862 | 5/1925 | Jamieson _____ 52—343 |
| 2,863,642 | 12/1958 | Pagett _____ 256—22 |
| 3,020,602 | 2/1962 | Siering _____ 85—13 X |
| 3,049,042 | 8/1962 | De Lynn _____ 85 |

FOREIGN PATENTS 103,205   1/1964   Norway.

DENNIS L. TAYLOR, Primary Examiner

U.S. Cl. X.R.

29—432